US008666805B2

(12) United States Patent
Chase

(10) Patent No.: US 8,666,805 B2
(45) Date of Patent: Mar. 4, 2014

(54) SYSTEMS, METHODS, AND MEDIA FOR INDUCING CONSUMER LOYALTY

(71) Applicant: Changeswipe LLC, Mt. Vernon, NY (US)

(72) Inventor: Edward Browning Chase, Mt. Vernon, NY (US)

(73) Assignee: Changeswipe LLC, Mt. Vernon, NY (US)

( * ) Notice: Subject to any disclaimer, the term of this patent is extended or adjusted under 35 U.S.C. 154(b) by 0 days.

(21) Appl. No.: 13/765,264

(22) Filed: Feb. 12, 2013

(65) Prior Publication Data
US 2013/0211895 A1    Aug. 15, 2013

Related U.S. Application Data

(60) Provisional application No. 61/598,022, filed on Feb. 13, 2012.

(51) Int. Cl.
G06Q 30/00    (2012.01)

(52) U.S. Cl.
USPC ............... 705/14.17; 705/14.27; 705/14.34; 705/14.33; 705/14.38; 705/14.1

(58) Field of Classification Search
USPC ...................................................... 705/14.17
See application file for complete search history.

(56) References Cited

U.S. PATENT DOCUMENTS

| 5,557,516 | A | | 9/1996 | Hogan |
| 5,620,079 | A | * | 4/1997 | Molbak ..................... 194/217 |
| 5,650,761 | A | | 7/1997 | Gomm et al. |
| 5,804,807 | A | * | 9/1998 | Murrah et al. ............... 235/383 |
| 5,991,376 | A | * | 11/1999 | Hennessy et al. .......... 379/114.1 |
| 6,164,533 | A | | 12/2000 | Barton |
| 6,857,562 | B2 | | 2/2005 | Sasaki |
| 7,284,696 | B2 | | 10/2007 | Begola |
| 7,686,218 | B2 | | 3/2010 | Hessburg et al. |
| 2002/0194122 | A1 | | 12/2002 | Knox et al. |
| 2005/0080737 | A1 | | 4/2005 | Stein et al. |

(Continued)

OTHER PUBLICATIONS

Karim, "Behind the Times—I learn about Keep the Change", WiseBread, Feb. 1, 2007, on line at wisebread.com/behind-the-times-i-learn-about-keep-the-change.*

(Continued)

Primary Examiner — John G Weiss
Assistant Examiner — Scott C Anderson
(74) Attorney, Agent, or Firm — Byrne Poh LLP

(57) ABSTRACT

Systems, methods, and media are provided for inducing customer loyalty that are configured to: identify a loyalty account associated with a consumer, wherein the loyalty account is part of as loyalty program established by a retailer, create a monetary account linked to the consumer's loyalty account, designate an amount of change from a cash transaction at the retailer to be deposited into the monetary account, deposit the amount of change into the monetary account by adding the designated amount of change to an existing balance of the monetary account to create a new balance, determine if the consumer is entitled to a reward based on the depositing of the designated amount of change into the monetary account and at least one threshold; and display to the consumer the outcome of the determining.

15 Claims, 9 Drawing Sheets

(56) References Cited

U.S. PATENT DOCUMENTS

| | | | |
|---|---|---|---|
| 2006/0010068 A1 | 1/2006 | Haber | |
| 2006/0258433 A1* | 11/2006 | Finocchio et al. | 463/16 |
| 2007/0029378 A1 | 2/2007 | Begola | |
| 2008/0103970 A1 | 5/2008 | Books et al. | |
| 2009/0171838 A1 | 7/2009 | Liu et al. | |
| 2010/0280945 A1 | 11/2010 | Vago et al. | |
| 2011/0215139 A1 | 9/2011 | Herold et al. | |

OTHER PUBLICATIONS

"Bank of America Keep the Change Program", available at: http://www.bankofamerica.com/promos/jump/ktc_coinjar/.

"Using a SmarTrip Card on Bus and Rail", available at: http://www.wmata.com/fares/smartrip/smartrip_qanda.cfm#processingorder.

Derkowitz, Beth, "Details of the Starbucks Duetto Card Application", available at: http://www.streetdirectory.com/travel_guide_166083/credit_cards/details_of_the_starbucks_duetto_card_application.html.

* cited by examiner

SYSTEMS, METHODS, AND MEDIA FOR INDUCING CONSUMER LOYALTY

CROSS REFERENCE TO RELATED APPLICATION

This application claims the benefit of U.S. Provisional Patent Application No. 61/598,022 filed Feb. 13, 2012, which is hereby incorporated by reference herein in its entirety.

TECHNICAL FIELD

The disclosed subject matter relates to systems, methods, and media for inducing consumer loyalty.

BACKGROUND

Retail stores have found it advantageous to offer programs that are designed to promote inducing consumer loyalty. For example, stores provide discount cards which, when used, cause their owners to receive, discounts as a reward for their loyalty. These programs are convenient and result in savings to the consumer. Importantly, by saving consumers money, these programs induce consumers to return to stores and make repeat purchases.

A significant portion of purchases that take place at retail stores are made using cash. When cash is used, consumers are usually given coins in the form of change. These coins are often set aside after consumers take possession of them. For example, coins may be placed in a coin jar and forgotten about. Over time, for any given consumer, the total amount of money that is set aside can add up to be substantial.

Accordingly, a need exists for mechanisms for promoting consumer loyalty that take advantage of change that would otherwise be set aside by consumers

SUMMARY

In some embodiments, methods for inducing consumer loyalty are provided. The methods comprising: identifying a loyalty account associated with a consumer, wherein the loyalty account is part of a loyalty program established by a retailer; creating a monetary account linked to the consumer's loyalty account; designating an amount of change from a cash transaction at the retailer to be deposited into the monetary account; depositing the amount of change into the monetary account by adding the designated amount of change to an existing balance of the monetary account to create a new balance; determining, by a hardware processor, if the consumer is entitled to a reward based on the depositing of the designated amount of change into the monetary account and at least one threshold; and displaying to the consumer the outcome of the determining.

In some embodiments, systems for inducing consumer loyalty are provided. The systems include a hardware processor that is configured to: identify to loyalty account associated with a consumer, wherein the loyalty account is part of a loyalty program established by a retailer; create a monetary account linked to the consumer's loyalty account; designate an amount of change from a cash transaction at the retailer to be deposited into the monetary account; deposit the amount of change into the monetary account by adding the designated amount of change to an existing balance of the monetary account to create a new balance; determine if the consumer is entitled to a reward based on the depositing of the designated amount of change into the monetary account and at least one threshold; and display to the consumer the outcome of the determining.

In some embodiments, non-transitory computer readable media are provided that contain computer-executable instructions which, when executed by a processor, cause the processor to perform a method for inducing of customer loyalty, the method comprising: identifying a loyalty account associated with a consumer, wherein the loyalty account is part of a loyalty program established by a retailer; creating a monetary account linked to the consumer's loyalty account; designating an amount of change from a cash transaction at the retailer to be deposited into the monetary account; depositing the amount of change into the monetary account by adding the designated amount of change to an existing balance of the monetary account to create a new balance; determining if the consumer is entitled to a reward based on the depositing of the designated amount of change into the monetary account and at least one threshold; and displaying to the consumer the outcome of the determining.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Systems, methods, and media for inducing consumer loyalty are provided.

In some embodiments, these systems, methods, and media can provide a loyalty account into which a consumer can earn credit and use credit. This account can be represented by a loyalty card in some embodiments. In some embodiments, this loyalty account can be used in connection with a fast food restaurant and/or any other suitable type of business, such as drug stores, retail businesses, department stores, convenience stores, and general merchandise stores, in some embodiments, credit can be earned on an account by applying at least a portion of change from a purchase to the account. In some embodiments, credit can additionally or alternatively be earned by making a certain number of purchases, by making purchases totaling a certain dollar amount, by making a purchase in response to a promotion, by winning a drawing, lottery, sweepstakes, etc., by being a customer for a certain period of time, and/or by taking any other suitable action.

Figure 1:
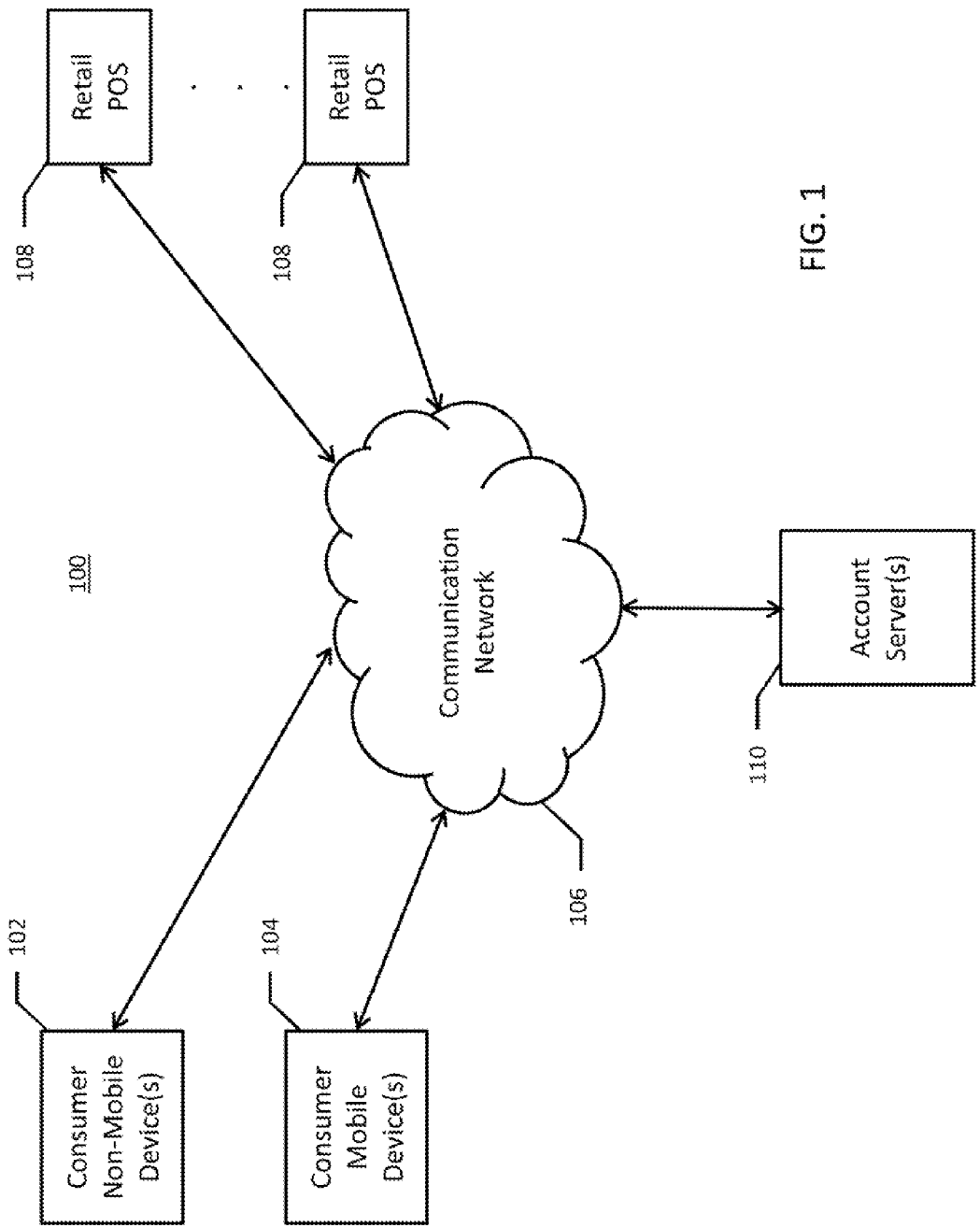
FIG. 1 is an example of hardware that can be used in accordance with some embodiments of the disclosed subject matter.

Turning to FIG. 1, an example of hardware 100 that can be used in some embodiments is shown. This hardware can include consumer non-mobile devices 102, consumer mobile devices 104, a communication network 106, retail point of sale devices 108, and/or account servers 110. Any suitable number of these components can be used in some embodiments. Any one or more of consumer non-mobile devices, consumer mobile devices, a communication network, retail point of sale devices, and/or account servers can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, consumer non-mobile devices and/or consumer mobile devices can be implemented as a desktop computer, a laptop computer, a tablet computer, a personal data assistant (PDA), at portable email device, a multimedia terminal, a mobile telephone, a set-top box, a television, a network appliance, etc. As another example, retail point of sale (POS) devices 108 can be implemented as special purpose computers including a special purpose keyboard or touch screen, a special purpose display, a special purpose printer, and a cash-drawer interface. An additional example involves customers using private information, such as a phone number or password, to access their accounts without any devices or cards. In some embodiments, the invention may present as an added function or capability to an existing loyalty program or card and by giving said program or card the capability to earn loyalty through any of the mentioned or other listed ways, transform and enhance a loyalty card or program.

For example, each account can have a balance that is updated when a customer pays with change, stores change, or earns rewards. Each account can also have a rewards tracker, which can be 3 digits (e.g., $3.65) for example, or any other suitable number of digits, representing the customer's cumulative amount of change stored. When the rewards tracker reaches a rewards threshold (e.g. $10), a dollar (or any other suitable amount) can be added to the customers account balance and the rewards tracker can be reset to zero.

Storing the users' accounts balances can be done on servers in a network or the cloud in some embodiments. One such example for how storage can be implemented is in connection with a large number of users (e.g., 50 million or any other suitable number of users). In this example, each user account can have a unique account number which, stored in binary, can be 3.25 Bytes (26 bits) long or any other suitable length). Additionally, each user's rewards tracker can be stored on 1.25 Bytes (10 bits), or any other suitable amount of storage, covering all the numbers from 0 to 999 (representing penny increments up to ten dollars, at which point it resets to 0). Similarly, 2 bytes (16 bits) can enable storage of balances up to $655 per user account for example.

In some embodiments, when a consumer enters a retail location, such as a fast food restaurant, the consumer can have choices to obtain a new card, earn credit on a card, use a card, and/or take any other suitable action. A retail location employee, who operates a retail POS device may operate the retail POS device to enable the consumer to exercise these choices in some embodiments. In some embodiments, the consumer may exercise these choices via the retail POS device in a self-service manner.

Figure 2:
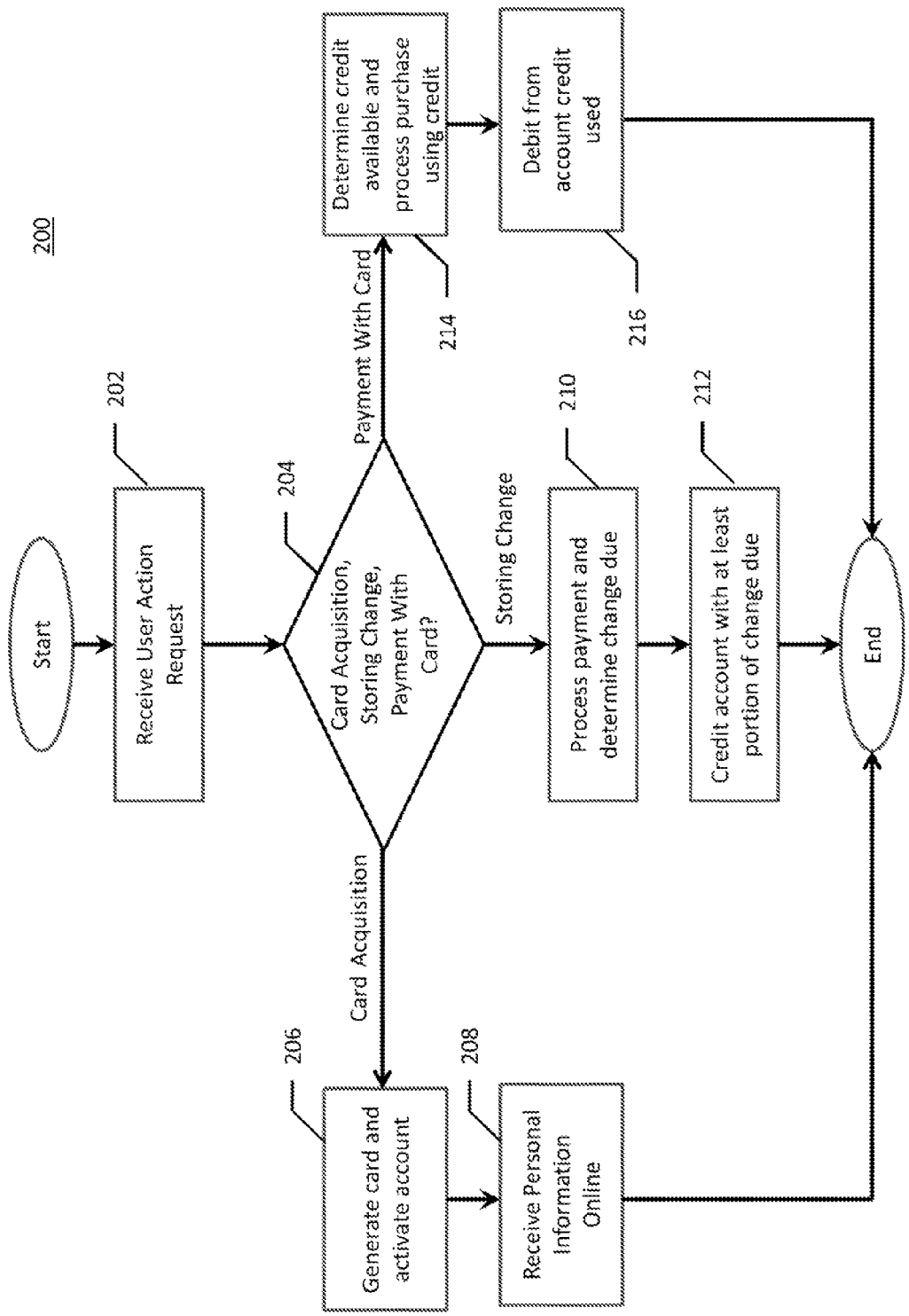
FIG. 2 is a flowchart of an example of a process in accordance with some embodiments of the disclosed subject matter.
Figure 3:
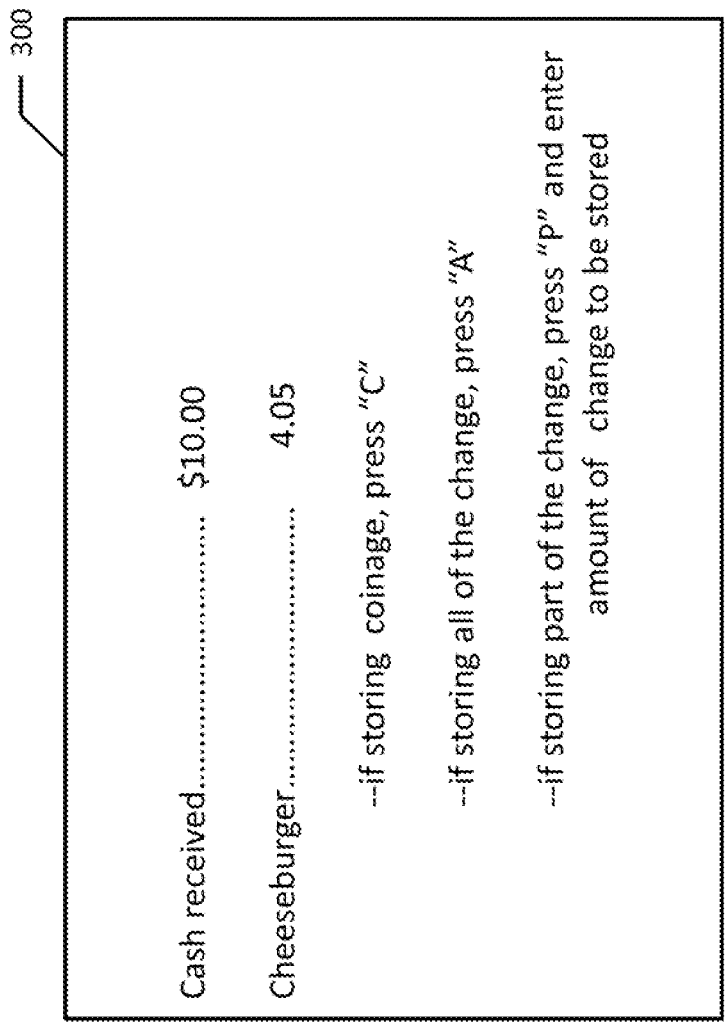
FIG. 3 is an example of an interface for allowing a user to select how to handle change from a transaction in accordance with some embodiments of the disclosed subject matter.
Figure 4:
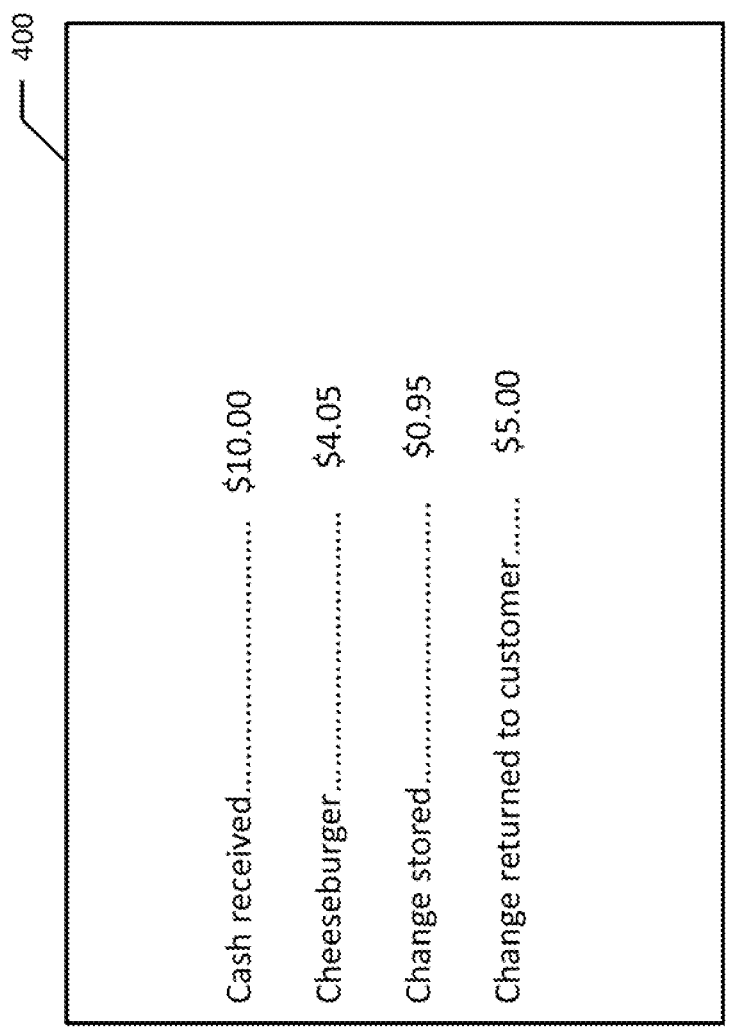
FIG. 4 is an example of an interface for showing how change was handled in accordance with some embodiments of the disclosed subject matter.
Figure 5:
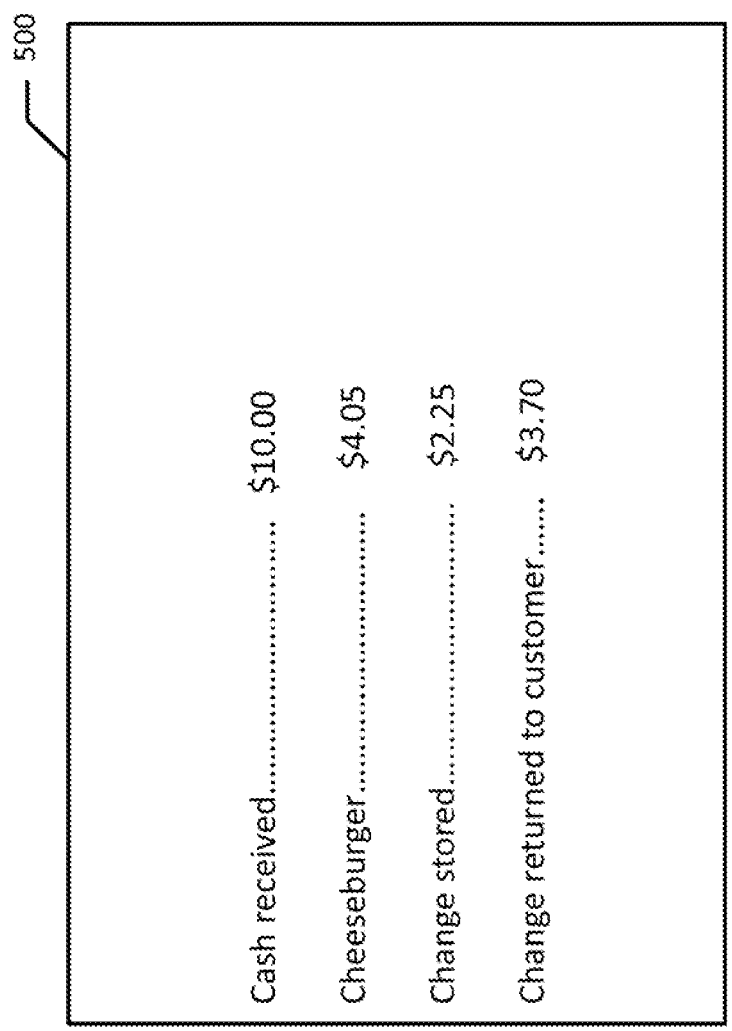
FIG. 5 is another example of an interface for showing how change was handled in accordance with some embodiments of the disclosed subject matter.
Figure 6:
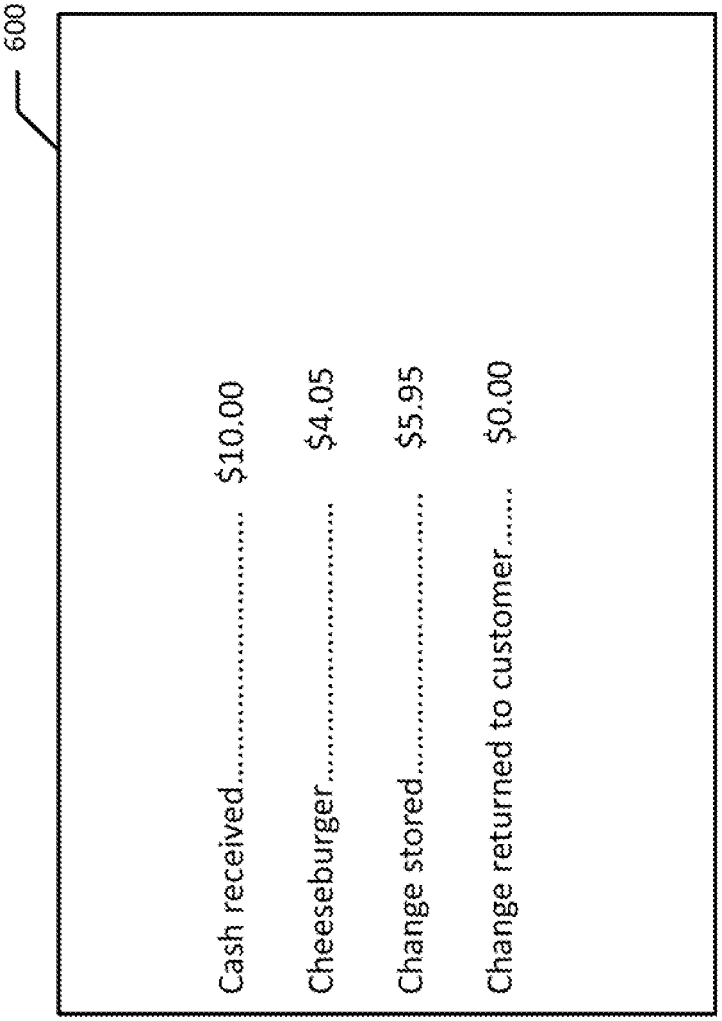
FIG. 6 is yet another example of an interface for showing how change was handled in accordance with some embodiments of the disclosed subject matter.

A flow-chart of a process 200 for enabling a consumer to exercise these choices that can be implemented in it retail POS device in some embodiments is shown in FIG. 2. As illustrated, at 202, the device can receive a user action request. Next, at 204, the process can determine whether this request is for a new card or account), is to earn credit, or is to use credit.

If the request is to receive to new card (or account), at 206, the device can receive cardholder information. Any suitable information can be received in some embodiments, and this information can be received in any suitable manner. For example, a user name, age, birthday, physical address, email address, phone number, and/or any other suitable information can be received. Then, the process can generate a card and/or activate an account for the consumer. In some embodiments, at 208, the cardholder information may be uploaded to as centralized database over network 106.

A card can take any suitable form. For example, in some embodiments, a card can be premade with a 16-digit account number and a consumer's name can be imprinted on the card above the account number at the retail location. Such card may be dispensed from the retail POS device and/or from any other suitable device, such as an unmanned machine. These cards can include any suitable technology, such as barcodes, RFID transceivers, magnetic stripes, etc.

After receiving a card, or after it is determined that a consumer wants to earn credit, the consumer can apply change from a purchase to the card and/or account. This can be accomplished in some embodiments by processing, the purchase, determining the change due, and crediting the card and/or account with at least a portion of the change due. For example, at 210, when taking a purchase, the consumer may hand the card along with cash to a cashier to store change from his or her purchase in the account. Next, at 212, the cashier may swipe the card through a scanner and/or reader to identity the consumer's account. When the card is swiped to capture change, the cashier may then be asked by the retail POS device how much of the consumer's change is to be stored on the card and/or account. The consumer can then select, via the cashier, to save only "the coinage" (that is, the coin portion of the change, and not the paper portion), "all of it" (that is, both the coin portion and the paper portion), a specific amount, a random amount, and/or any other suitable amount. If the "coinage" is selected, the cashier can then press a "c" key on the retail POS device, and then press the "enter" key and return the consumer's card and the amount of paper money in change owed to the consumer. If "all of it" is selected, the cashier can press the "a" key on the retail POS device, and then press the "enter" key and return the consumer's card without handing back any change from the transaction. If a partial amount is specified, the cashier can press the "p" key, then enter the desired amount to be stored on the card, and then press the "enter" key and return the consumer's card and whatever the difference is between the total amount of change from the transaction and the amount the consumer decided to store on the card. Examples of interfaces 300, 400, 500, and 600 for these options are shown in FIGS. 3, 4, 5, and 6 in accordance with some embodiments.

Storing change on the card and/or account may cause a notation to be made on the account that the consumer qualifies for one or more promotions, discounts, and/or any other suitable benefits.

Figure 7:
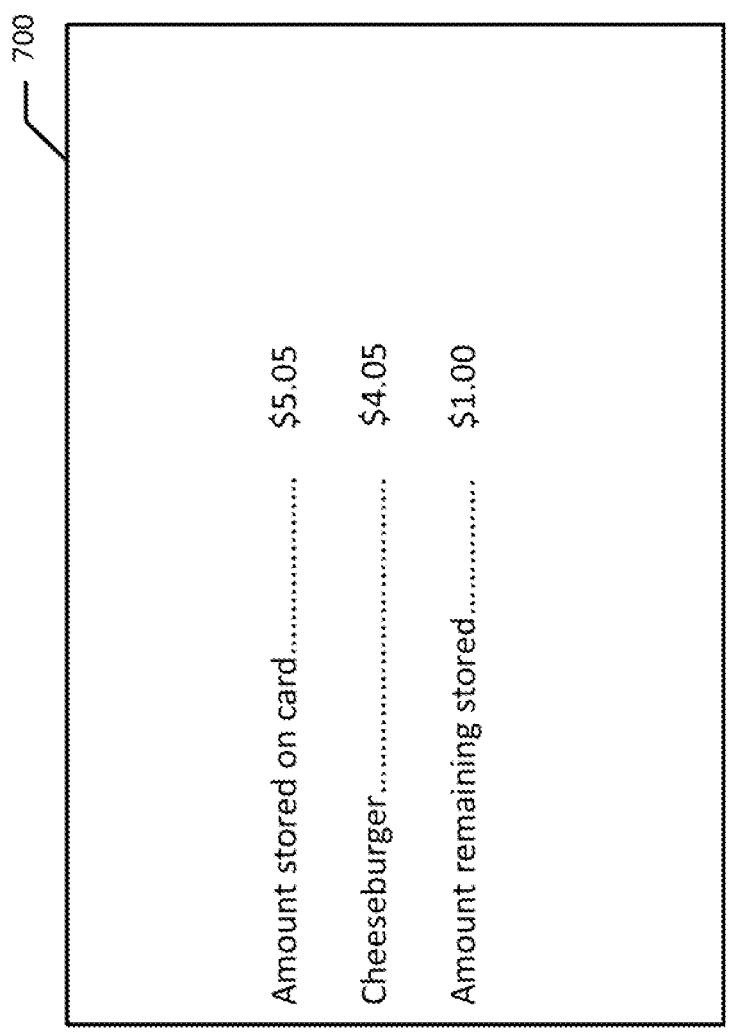
FIG. 7 is an example of an interface for making a purchase using stored credit in accordance with some embodiments of the disclosed subject matter.
Figure 8:
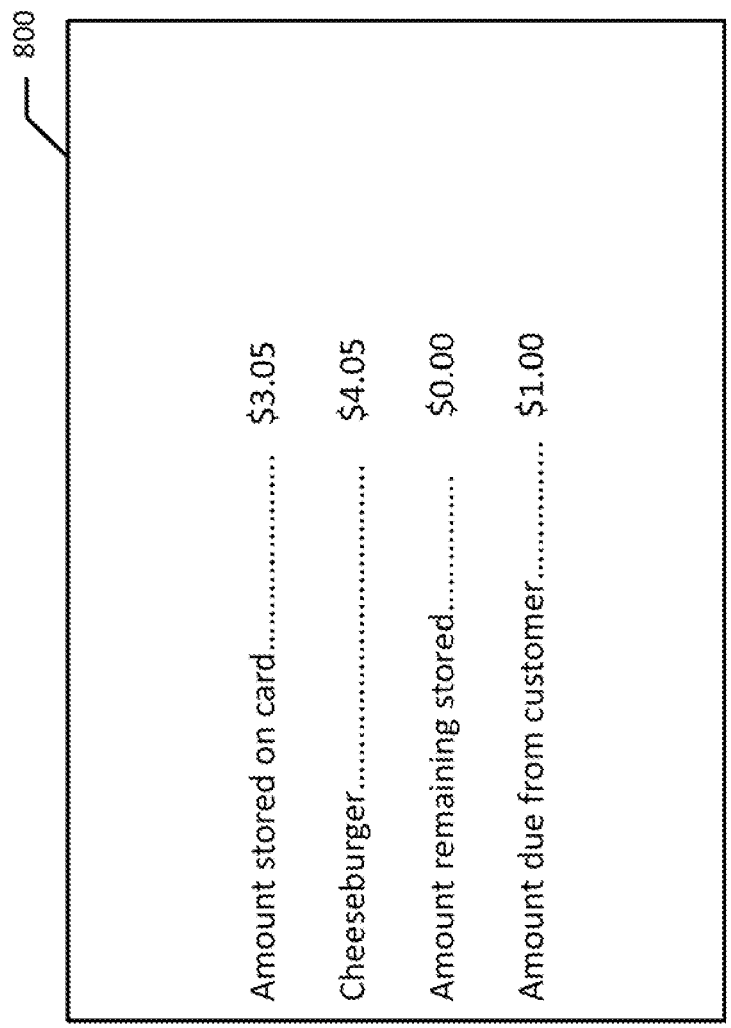
FIG. 8 is an example of an interface for making as purchase using stored credit plus cash in accordance with some embodiments of the disclosed subject matter.
Figure 9:
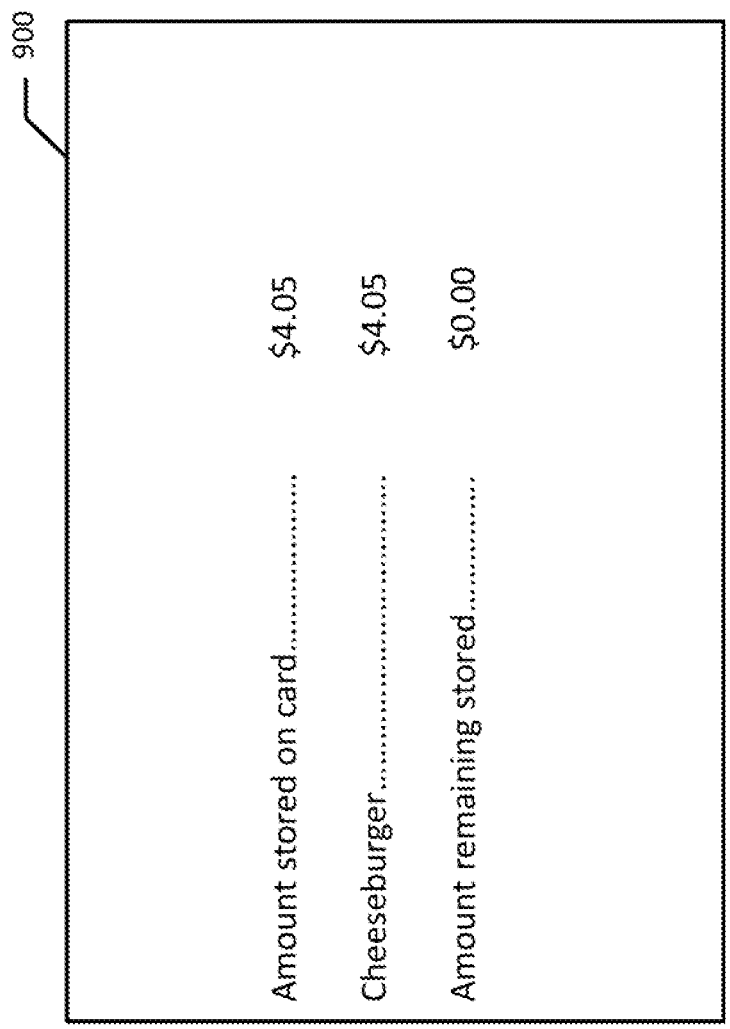
FIG. 9 is another example of an interface for making a purchase using stored credit in accordance with some embodiments of the disclosed subject matter.

If the request is to use credit on the card to make a purchase, at 214, the consumer can hand his or her card to cashier in order to make a purchase (along with money if the credit stored on card and/or account is insufficient to cover the purchase). At 216, the retail POS device can determine the balance on consumer's card (A) and the amount due for purchase (B), and:

(i) if A>B, deduct B from A and reflect balance in the consumer's card;
(ii) if A=B, make the consumer's card balance 0 and return no change; or
(III) if A<B, subtract A from amount owed for the purchase, make the balance on consumer's card 0, and show (B−A) as amount owed to cashier. Examples of interfaces 700, 800, and 900 for these options are shown in FIGS. 7, 8, and 9 in accordance with some embodiments.

Purchases in which credit is applied to and/or used from the card can be tracked and stored in a database for analysis to improve future marketing efforts and better meet consumer demand for particular products.

In some embodiments, a consumer can check the balance on the card and/or account on a Web page associated with the retail location. In order to do so, in some embodiments, the consumer can enter his or her card number and/or any suitable other identifying information to log into the Web page.

In some embodiments, when customers provide their card, mobile application or any other means for presenting coupons, discounts or other means to acquire a better deal, the cashier can log the necessary information to store change from the transaction without requiring the customer to present identifying information again.

In some embodiments, consumers can accrue benefits by storing increasing amounts on their cards. For example, accumulating ten dollars on one's card may result in a reward of one dollar being added to that user's balance in some embodiments. At checkout, a member may scan his/her card, mobile application, or input his/her phone number and pin in order to credit his/her account with an amount equal to the change he/she chooses to store. This balance can be used just like a gift card to pay for part or all of a purchase. Furthermore, for every ten dollars stored in a member's account, his/her account can be credited with an additional dollar or any other suitable amount.

Additionally or alternatively, a three-dollar credit (or any other suitable credit) may be given to consumers reaching a twenty-five dollar threshold (or any other suitable threshold) in their balances in some embodiments. Larger rewards may be given to consumers with greater balances in some embodiments.

In some embodiments, in order to further incentivize users to use their cards, after a given number of uses of a card (e.g., a thousandth use of a card by all users) for a purchase and/or change storage, that thousandth user may qualify for a lottery type drawing in which the winner can earn a prize. These lotteries can be televised, shown on a Web page, etc.

In some embodiments, a retail POS device can be dedicated to card transactions and may require a card swipe and/or read before a purchase will be permitted.

Money in the accounts can automatically be stored in separate custodial accounts by a retailer and/or may be invested in any suitable investment (such as short term bonds).

In some embodiments, users' busing habits and email addresses can be tracked and used to target promotional offers to certain of the users.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable mad only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method of inducing customer loyalty, the method comprising:
    identifying a loyalty account associated with a consumer and a retailer by a hardware processor of a point of sale (POS) device;
    determining by the hardware processor of the POS device an amount owed by the consumer in connection with a transaction with the retailer;
    determining by the hardware processor of the POS device an amount of cash received from the consumer as payment for the amount owed;
    determining by the hardware processor of the POS device an amount of change as the difference between the amount of cash received and the amount owed;
    designating by the hardware processor of the POS device at least a portion of the amount of change as to be deposited into a monetary account linked to the consumer's loyalty account;
    determining by the hardware processor of the POS device if the consumer is entitled to a reward based on the depositing of the designated amount of change into the monetary account and at least one threshold; and
    displaying to the consumer the outcome of the determining.

2. The method of claim 1, wherein the identifying further comprises:
    reading a loyalty account card associated with the consumer's loyalty account.

3. The method of claim 1, wherein the identifying further comprises:
    receiving a telephone number associated with the consumer's loyalty account.

4. The method of claim 1, wherein the determining if the consumer is entitled to a reward further comprises:
    comparing a new balance of the monetary account to a plurality of specified rewards thresholds, and if the new balance exceeds one of the plurality of rewards thresholds, determining that the consumer is entitled to a reward associated with the specified rewards threshold.

5. The method of claim 1, further comprising:
providing a reference number for each transaction where a designated amount of change is deposited by any consumer; and
wherein the determining if the consumer is entitled to a reward further comprises:
comparing the reference number associated with the depositing with a set threshold, and entering the consumer in a drawing for a prize if the reference number associated with the depositing is a whole number multiple of the set threshold.

6. A system for inducing customer loyalty, the system comprising:
a hardware processor of a point of sale (POS) device configured to:
identify a loyalty account associated with a consumer and a retailer;
determine an amount owed by the consumer in connection with a transaction with the retailer;
determine an amount of cash received from the consumer as payment for the amount owed;
determine an amount of change as the difference between the amount of cash received and the amount owed;
designate at least a portion of the amount of change as to be deposited into a monetary account linked to the consumer's loyalty account;
determine if the consumer is entitled to a reward based on the depositing of the designated amount of change into the monetary account and at least one threshold; and
display to the consumer the outcome of the determining.

7. The system of claim 6, wherein the identifying further comprises:
reading a loyalty account card associated with the consumer's loyalty account.

8. The system of claim 6, wherein the identifying further comprises:
receiving a telephone number associated with the consumer's loyalty account.

9. The system of claim 6, wherein the determining if the consumer is entitled to a reward further comprises:
comparing a new balance of the monetary account to a plurality of specified rewards thresholds, and if the new balance exceeds one of the plurality of rewards thresholds, determining that the consumer is entitled to a reward associated with the specified rewards threshold.

10. The system of claim 6, wherein the processor is further configured to:
provide a reference number for each transaction where a designated amount of change is deposited by any consumer; and
wherein the determining if the consumer is entitled to a reward further comprises:
comparing the reference number associated with the depositing with a set threshold, and entering the consumer in a drawing for a prize if the reference number associated with the depositing is a whole number multiple of the set threshold.

11. A non-transitory computer readable medium containing computer-executable instructions that, when executed by a processor, cause the processor to perform a method for inducing customer loyalty, the method comprising:
identifying a loyalty account associated with a consumer and a retailer;
determining an amount owed by the consumer in connection with a transaction with the retailer;
determining an amount of cash received from the consumer as payment for the amount owed;
determining an amount of change as the difference between the amount of cash received and the amount owed;
designating at least a portion of the amount of change as to be deposited into a monetary account linked to the consumer's loyalty account;
determining if the consumer is entitled to a reward based on the depositing of the designated amount of change into the monetary account and at least one threshold; and
displaying to the consumer the outcome of the determining.

12. The non-transitory computer readable medium of claim 11, wherein the identifying further comprises:
reading a loyalty account card associated with the consumer's loyalty account.

13. The non-transitory computer readable medium of claim 11, wherein the identifying further comprises:
receiving a telephone number associated with the consumer's loyalty account.

14. The non-transitory computer readable medium of claim 11, wherein the determining if the consumer is entitled to a reward further comprises:
comparing a new balance of the monetary account to a plurality of specified rewards thresholds, and if the new balance exceeds one of the plurality of rewards thresholds, determining that the consumer is entitled to a reward associated with the specified rewards threshold.

15. The non-transitory computer readable medium of claim 11, wherein the method further comprises:
providing a reference number for each transaction where a designated amount of change is deposited by any consumer; and
wherein the determining if the consumer is entitled to a reward further comprises:
comparing the reference number associated with the depositing with a set threshold, and entering the consumer in a drawing for a prize if the reference number associated with the depositing is a whole number multiple of the set threshold.

* * * * *